United States Patent
Herrwerth et al.

(10) Patent No.: US 7,361,777 B2
(45) Date of Patent: Apr. 22, 2008

(54) ORGANICALLY MODIFIED SILOXANES AND THEIR USE FOR PRODUCING PREPARATIONS FOR WATER-REPELLENT IMPREGNATIONS FOR MINERAL BUILDING MATERIALS

(75) Inventors: Sascha Herrwerth, Essen (DE); Frank Koenig, Gelsenkirchen (DE); Andrea Lohse, Bottrop (DE)

(73) Assignee: Goldschmidt GmbH, Essen (DE)

( * ) Notice: Subject to any disclaimer, the term of this patent is extended or adjusted under 35 U.S.C. 154(b) by 0 days.

(21) Appl. No.: 11/673,682

(22) Filed: Feb. 12, 2007

(65) Prior Publication Data

US 2007/0190306 A1    Aug. 16, 2007

(30) Foreign Application Priority Data

Feb. 15, 2006  (DE) ...................... 10 2006 007 018

(51) Int. Cl.
  *C07F 7/04* (2006.01)
  *B32B 3/06* (2006.01)
(52) U.S. Cl. ...................................... 556/445; 428/307
(58) Field of Classification Search ..................... None
  See application file for complete search history.

(56) References Cited

U.S. PATENT DOCUMENTS

| | | |
|---|---|---|
| 4,486,476 A | 12/1984 | Fritsch et al. |
| 4,781,950 A | 11/1988 | Giesing et al. |
| 5,091,002 A | 2/1992 | Schamberg et al. |

FOREIGN PATENT DOCUMENTS

| | | |
|---|---|---|
| DE | 3627 060 C1 | 7/1987 |
| DE | 40 29 640 | 3/1992 |
| EP | 0 234 024 A1 | 12/1986 |

*Primary Examiner*—Samuel A. Bart
(74) *Attorney, Agent, or Firm*—Frommer Lawrence & Haug LLP

(57) ABSTRACT

The invention relates to organomodified siloxane compounds of the general formula (I)

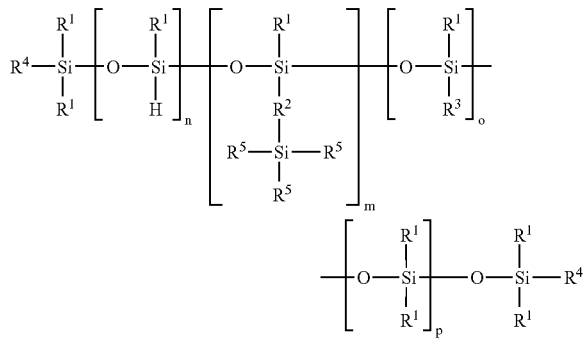

the use of at least one of these compounds for producing aqueous preparations for the water-repellent impregnation of porous mineral building materials.

17 Claims, No Drawings

ORGANICALLY MODIFIED SILOXANES AND THEIR USE FOR PRODUCING PREPARATIONS FOR WATER-REPELLENT IMPREGNATIONS FOR MINERAL BUILDING MATERIALS

This application claims benefit under 35 U.S.C. 119(a) of German patent application DE 10 2006 007 018.6, filed on 15 Feb. 2006.

Any foregoing applications including German patent application DE 10 2006 007 018.6, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Citation or identification of any document in this application is not an admission that such document is available as prior art to the present invention.

The invention relates to organically modified siloxanes and their use for producing preparations for water-repellent impregnations for mineral building materials, which are based on organomodified siloxane compounds which simultaneously have hydrogen bound to Si atoms and alkoxy groups in the molecule.

Organosilanes or organosiloxanes have for many years been used for impregnating porous mineral building materials in order to protect the latter from penetration by water. In this hydrophobicizing treatment, it is particularly important that the active substances penetrate deep into the building material and combine chemically or physically with the building material.

The penetration into the building material is favored when very low molecular weight compounds are used as organosilicon active substances. The penetration depth can additionally be improved by the concomitant use of organic solvents which evaporate after treatment of the building material.

A high reactivity is achieved when organoalkoxysilanes and/or organoalkoxysiloxanes which can condense under the action of moisture and react with the building material are used as organosilicon compounds. Here, the alcohol corresponding to the alkoxy group is eliminated and evaporates into the atmosphere.

U.S. Pat. No. 4,486,476 discloses such a preparation having a content of organoalkoxysilanes of the general formula

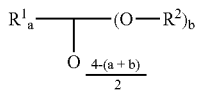

where

R$^1$ is an alkyl or aryl radical,

R$^2$ is an alkyl radical having from 1 to 4 carbon atoms, a=0.8 to 1.5 and b is ≦2.

This preparation comprises a) from 1 to 20% by weight of a mixture of organoalkoxysiloxanes of the abovementioned formula, which comprises from 25 to 75% by weight of a siloxane whose value of b is from 0.1 to 0.5 and from 75 to 25% by weight of a siloxane whose value of b is from 0.8 to 2.0, with a+b being ≦3, b) from 80 to 99% by weight of a solvent which is immiscible with water and c) optionally, condensation catalysts known per se.

The essential feature of this preparation is that the impregnation is not carried out using an organoalkoxysiloxane whose molecular weight distribution has essentially only a single maximum but instead a mixture of organoalkoxysiloxanes which have different degrees of condensation.

This ensures a high penetration depth and also a high effectiveness, in particular on alkaline building materials, and a good, visible water beading effect.

This preparation can be improved essentially only in respect of the penetration depth which can be achieved in practice. This penetration depth is influenced by essentially three factors, namely the solvents used, the porosity of the building materials and the care with which these preparations are employed in practice. It is therefore necessary to measure, in particular, the penetration behavior of improved preparations for impregnation.

Due to increased environmental awareness, the use of organic solvents is increasingly considered to be undesirable. Efforts have therefore been made, in particular, to develop comparable preparations having an aqueous basis.

Further development work has led to a process which is subject matter of U.S. Pat. No. 4,781,950. This patent document relates to a process for impregnating mineral building materials, in particular masonry, with aqueous solutions of silanols and/or siloxanols which are produced where they are to be used by hydrolysis of alkoxysilanes and/or alkoxysiloxanes. Here, the alkoxysilanes and/or alkoxysiloxanes selected are compounds of the general formula

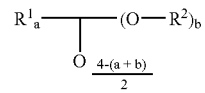

where

R$^1$=alkyl radical having from 1 to 8 carbon atoms, with at least 90% of the radicals R$^1$ present in the average molecule being alkyl radicals having from 1 to 4 carbon atoms, R$^2$=methyl or ethyl radical, a=0 to 1.5, b=1.0 to 4.0, a+b=2.0 to 4.0, these are hydrolyzed continuously in an amount corresponding to consumption and the solution obtained is applied within from 3 to 30 minutes after mixing of the reactants to the mineral building material.

In this type of process, the penetration of the aqueous preparations into the mineral building material is high and comparable to the penetration achieved when using solvent-containing preparations.

However, these aqueous solutions have to be, as advised in DE-C-36 27 060 (U.S. Pat. No. 4,781,950), prepared at the site of use because of their storage instability.

The published European patent application EP-A-0 234 024 (U.S. Pat. No. 4,648,904 and US-Rei-33,759) describes an aqueous silane emulsion for hydrophobicizing ceramic materials which consists essentially of a) from 1 to 40% by weight of a hydrolyzable silane having a molecular weight up to about 500 and the general formula $R_nSi(R')_{4-n}$, where R is a halogenated or unhalogenated hydrocarbon radical having from 1 to 20 carbon atoms, R' is an alkoxy radical having from 1 to 3 carbon atoms, a halogen, amino or carboxyl radical, n=1 or 2, or oligomers of these silanes and b) from 0.5 to 50% by weight, based on silane, of an emulsifier having an HLB of from 4 to 15 and c) water.

As particularly preferred silane, mention is made of octyltriethoxysilane. Emulsions of such silanes in which the radical R has more than 6 carbon atoms actually have an increased stability since the hydrolysis rate of these reactive silanes is reduced.

However, a disadvantage is that the hydrolysis of these silanes in the building material necessarily also proceeds correspondingly slowly and has to be catalyzed in an appropriate way. In some building materials, e.g. fresh concrete, this is possible by means of their high alkalinity. However, it is not possible in neutral or weakly alkaline building materials such as fired clinker and numerous types of natural stone. However, anchoring of the silanes to the surface of the building material does not occur without such catalysis.

The silanes can evaporate from the surface or be removed mechanically. This leads to a depletion of the surface in silanes and thus to a reduction in the hydrophobicization. As a consequence, the water beading effect is weak or not present at all. The water absorption capability of the depleted surface layer is high, so that precisely this layer which is particularly exposed to weathering and mechanical damage is insufficiently protected. These preparations can thus be used only for particular building materials.

An impregnation emulsion which works well on alkaline and neutral building materials is described in U.S. Pat. No. 5,091,002. It contains from 2.5 to 25% by weight of an alkoxysilane of the general formula

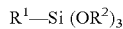

where

R$^1$=an alkyl radical having from 3 to 12 carbon atoms and

R$^2$=a methyl or ethyl radical, from 2 to 20% by weight of an alkoxysiloxane of the general formula

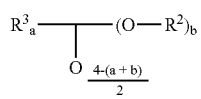

where

R$^3$ an alkyl radical having from 1 to 6 carbon atoms, a=0.8 to 1.2 and b=0.2 to 1.2, from 0.01 to 5% by weight of an emulsifier, from 0.01 to 0.1% by weight of fillers having an effective surface area of at least 40 m$^2$/g and from 49.9 to 95.48% by weight of water.

This impregnation emulsion generally has good beading effects both on alkaline and neutral mineral substrates. If the effects which can be achieved by means of this emulsion are graded according to the evaluation scheme indicated below, it is found that the best results are achieved when a) the emulsifier content is low, b) hydrophobicized silica and c) a curing catalyst for the organosilicon compounds are present in the emulsion.

However, the impregnation emulsion is stable for only a limited time at a low emulsifier content. If hydrophobicized silica is present in the emulsion, this frequently sediments during storage and makes careful stirring at the place of use, i.e. the building site, necessary.

This care is not always present. Finally, the curing catalyst limits the processing latitude of the emulsion in terms of time and can lead to premature curing of the active substance in the emulsion during storage.

Further development work has led to a process which is subject matter of DE-A-40 29 640 (U.S. Pat. No. 5,196,054). This is concerned with the problem of improving the use properties of such impregnation emulsions, in particular the problem of producing storage-stable emulsions which lead to a high beading effect within a short time, generally within one day, without addition of hydrophobicized silica or specific curing catalysts being necessary. These preparations are emulsions containing mixtures of, inter alia, various siloxane compounds which cure by means of a condensation reaction and in the process eliminate volatile alcohols (VOC) in amounts of from 250 to 500 g/l.

This leads to a low degree of utilization of the active substance and to increased pollution of the environment. In addition, in the case of aqueous systems/emulsions, the storage stability of the systems is limited as a result of the elimination of alcohol, since the emulsions are broken by the free alcohol. This has the consequence that the active substances condense and thus no longer penetrate sufficiently in later use.

Due to increased environmental awareness, the use of such VOC-rich formulations is increasingly considered to be undesirable. Efforts have therefore been made, in particular, to develop comparable but low-VOC preparations, with this also encompassing volatile solvents.

It is an object of the invention to discover an environmentally friendly system which hydrophobicizes the substrate and firstly penetrates readily into a mineral or organic building material, has a good beading effect and at the same time offers reduced liberation of volatile organic constituents and cures independently of the nature of the substrate.

This object is surprisingly achieved by the use of organomodified siloxane compounds which simultaneously contain hydrogen and alkoxy groups in the molecule.

The invention therefore provides, firstly, organomodified siloxane compounds of the general formula (I)

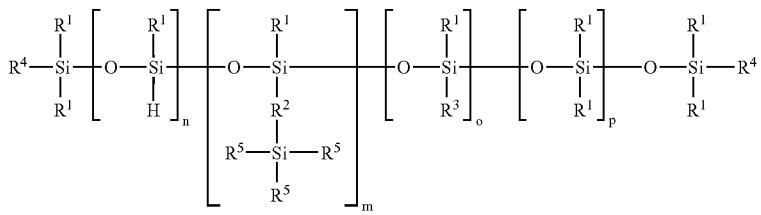

where
- the radicals $R^1$ are identical or different radicals selected from the group consisting of linear or branched, saturated or monounsaturated or polyunsaturated alkyl, aryl, alkylaryl or arylalkyl radicals having carbon atoms selected from the group consisting of from 1 to 20 carbon atoms, and from 1 to 10 carbon atoms, and haloalkyl groups having carbon atoms selected from 1 to 20 carbon atoms, 1 to 10 carbon atoms and 1-4 carbon atoms. One embodiment of $R^1$ is $\geq 90\%$ methyl groups,
- the radicals $R^2$ are identical or different alkylene radicals which have carbon atoms selected from the group consisting of from 1 to 20 carbon atoms, from 1 to <10 carbon atoms, from 1 to 5 carbon atoms, and the ether, ester, urethane or amide groups, and ethylene radicals,
- $R^3$ is an oxyalkylene radical of the formula (II),

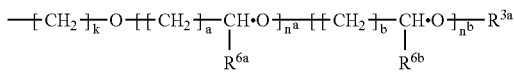

where
- the radicals $R^{3a}$ can each be, independently of one another, hydrogen or a branched or unbranched, unsubstituted or heteroatom-substituent-bearing, saturated or unsaturated alkyl or aryl radical which have carbon atoms selected from the group consisting of from 1 to 10 carbon atoms, 2 carbon atom (ethyl) and 1 carbon atom (ethyl) and
- $R^{6a}$, $R^{6b}$ can each be, independently of one another, hydrogen, a branched or unbranched, unsubstituted or heteroatom-substituent-bearing, saturated or unsaturated alkyl or aryl radical which have 1-10 carbon atoms, (in another embodiment of the invention $R^{6a}$, $R^{6b}$ can each be, independently of one another, hydrogen, methyl and/or ethyl radicals) and
- k is from 2 to 11,
- a, b are each, independently of one another, a number in the range from 1 to 4 and
- $n^a$, $n^b$ are each, independently of one another, a number in the range selected from the group consisting of from 0 to 50, where $1<n^a+n^b \leq 50$, $1<n^a+n^b \leq 30$, and $1<n^a+n^b \leq 15$,
- with a random or blockwise arrangement of the oxyalkylene units being able to be present,
- the radicals $R^4$ are each, independently of one another, $R^1$, $-R^2-Si(R^5)_3$, $R^3$ or H.
- the radicals $R^5$ are identical or different alkyl, alkoxy, aryl, aryloxy or alkenyl radicals having from 1 to 20 carbon atoms, with the proviso that at least one $R^5$ is an alkoxy group (in another embodiment of the invention $R^5$ is methoxy and/or ethoxy),
- n is a number selected from the range consisting of from 1 to 20, from 1 to 10, and from 1 to 5,
- m is from 0 to 20, with m only being 0 when $R^4$ is the radical $-R^2-Si(R^5)_3$ and otherwise is selected from the group consisting of being $\geq 1$, from 0 to 10, and from <5,
- o is a number selected from the range consisting of from 0 to 20, from 1 to 10, and $\leq 5$,
- p is a number selected from the range consisting of from 1 to 200, from 10 to 100, and from 10 to 50.

The invention further provides concentrates of aqueous emulsions for the water-repellent impregnation of inorganic and organic substrates, which comprise a) from 10 to 80% by weight, (in another embodiment of the invention, from 20 to 60% by weight, or from 30 to 50% by weight), of a compound of the general formula (I), (in another embodiment of the invention, the compound of general formula (I) are compounds in which $R^4$ corresponds to $R^2-Si(R^5)_3$, $R^5$ is an alkoxy function and n<5, m=0 and o+p<50 or $R^5$ is an alkoxy function and n<5, m=1 to 5 and o+p<50), b) from 0.5 to 10% by weight of an emulsifier or emulsifier mixture, (in another embodiment of the invention, from 1.0 to 5.0% by weight, or from 2.0 to 3.5% by weight), c) from 10 to 89.5% by weight of water and, optionally, d) from 0 to 0.5% by weight of preservatives.

It is possible to impregnate, i.e. hydrophobicize, all inorganic and organic substrates by means of the compounds of the invention, in particular the aqueous concentrates and/or the formulations which have been diluted to use concentration.

According to the invention, preference is given to mineral or wood-containing materials and finished parts and also products made therefrom, for example stones, slabs, tiles, mortar compositions, concrete compositions, insulation materials for thermal and acoustic insulation.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Emulsifiers which are concomitantly used according to the invention comprise one or more compounds from the group consisting of nonionogenic emulsifiers, i.e. addition products of alkylene oxides, preferably ethylene oxide, onto compounds having an active hydrogen, e.g. fatty alcohols, alkylphenols such as octylphenol, nonylphenol or dodecylphenol. The content of oxyethylene units should be sufficiently high for the HLB of the emulsifiers to be from 6 to 20, in particular from 10 to 18.

It is possible to use all preservatives known in the prior art. According to the invention, preference is given to products of the group: combination of heterocycles and methylol derivatives (for example N-methylolchloroacetamide, 5-chloro-2-methyl-2-isothiazol-3-one) and mixtures of hemiacetals with nonhazardous additions (for example [1,2-ethanediylbis-(oxy)]bismethanol).

The aqueous emulsion according to the invention can be produced by separately emulsifying the constituents a), b) and d) or emulsifying a mixture of the constituents. Here, the emulsifier is advantageously added to the component to be emulsified (or to a mixture thereof) and the emulsifier-containing mixture is heated if appropriate. The water c) is then added to this mixture while stirring well. The emulsion which is being formed or has been formed can be homogenized by means of suitable stirring apparatuses which preferably operate according to the rotor/stator principle. Colloid mills can also be used for reducing the particle size of the emulsified phase.

The invention is further described by the following non-limiting examples which further illustrate the invention, and are not intended, nor should they be interpreted to, limit the scope of the invention.

EXAMPLES

The following examples serve to illustrate the invention but do not constitute any restriction.

In the following:

M=—Si—(CH$_3$)$_3$

N=total chain length of Si chain

D=—Si(CH$_3$)$_2$—

D'=—Si(R) (CH$_3$)—

Example 1

Reaction of an internal SiH-siloxane (N=27.5, M-D20.5-D'5-M; SiH value: 0.248%) with styrene (Brenntag) and Dynasilan® VTMO (vinyltrimethoxysilane, Degussa AG) using a Pt-containing catalyst.

1016 g of the SiH siloxane (SiH value: 0.248%), 52 g of styrene and Karstedt catalyst (10 ppm of Pt based on the batch) are placed in a reaction vessel and heated to 80° C. The exothermic reaction which occurs leads to a temperature increase to about 103° C. After 3 hours, 126 g of Dynasilan® VTMO are added dropwise over a period of 3 hours, with the temperature not being allowed to exceed 110° C. After the addition is complete, the mixture is allowed to undergo an after-reaction at 110° C. for 1 hour. Distilling off the volatile compounds and filtering the product gives a clear, slightly yellowish liquid which has an SiH value of 0.097%.

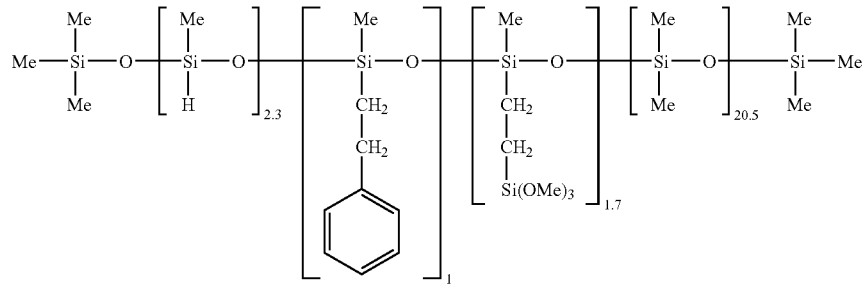

Example 2

Reaction of an internal SiH-siloxane (N=27.5, M-D20.5-D'5-M; SiH value: 0.248%) with an allyl alcohol-initiated, methyl end-capped, propylene oxide-containing polyether (—CH$_2$=CH—CH$_2$—(OC$_3$H$_6$)$_{18}$—OMe; M$_w$ about 1100) and Dynasilan® VTEO (vinyltriethoxysilane, Degussa AG) using a Pt-containing catalyst.

691 g of the SiH-siloxane (SiH value: 0.248%), 348 g of allyl alcohol-initiated, methyl end-capped, propylene oxide-containing polyether (CH$_2$=CH—CH$_2$—(OC$_3$H$_6$)$_{18}$—OMe; M$_w$ about 1100) and Karstedt catalyst (10 ppm of Pt based on the batch) are placed in a reaction vessel and heated to 80° C. The exothermic reaction which occurs leads to a temperature increase to about 100° C. After 3 hours, 110 g of Dynasilan® VTEO are added dropwise over a period of 3 hours, with the temperature not being allowed to exceed 110° C. After the addition is complete, the mixture is allowed to undergo an after-reaction at 110° C. for 1 hour. Distilling off the volatile compounds and filtering the product gives a clear, slightly yellowish liquid which has an SiH value of 0.08%.

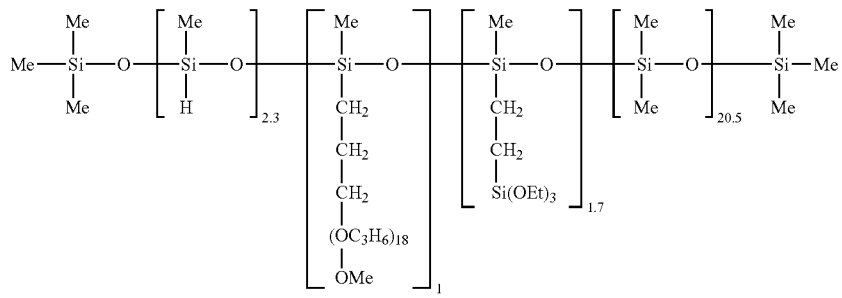

Example 3

Reaction of an internal SiH-siloxane (N=27.5, M-D20.5-D'5-M; SiH value: 0.248%) with 1-hexadecene and Dynasilan® VTEO (vinyltriethoxysilane, Degussa AG) using a Pt-containing catalyst.

955 g of the SiH-siloxane (SiH value: 0.248%), 106 g of 1-hexadecene and Karstedt catalyst (10 ppm of Pt based on the batch) are placed in a reaction vessel and heated to 80° C. The exothermic reaction which occurs leads to a temperature increase to about 95° C. After 3 hours, 152 g of Dynasilan® VTEO are added dropwise over a period of 3 hours, with the temperature not being allowed to exceed 110° C. After the addition is complete, the mixture is allowed to undergo an after-reaction at 110° C. for 2 hours.

Distilling off the volatile compounds and filtering the product gives a clear, colorless liquid which has an SiH value of 0.095%.

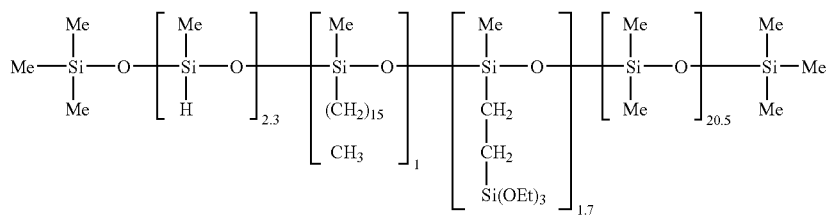

Example 4

Reaction of an internal SiH-siloxane (N=27.5, M-D20.5-D'5-M; SiH value: 0.248%) with Dynasilan® VTEO (vinyltriethoxyilane, Degussa AG) using a Pt-containing catalyst. 305 g of the SiH-siloxane (SiH value: 0.248%) and Karstedt catalyst (10 ppm of Pt based on the batch) are placed in a reaction vessel and heated to 100° C. 45.6 g of VTEO are subsequently added dropwise over a period of 1 hour, with the temperature not being allowed to exceed 110° C. After the addition is complete, the mixture is allowed to undergo an after-reaction at 110° C. for 2 hours.

Distilling off the volatile compounds and filtering the product gives a clear, colorless liquid which has an SiH value of 0.15%.

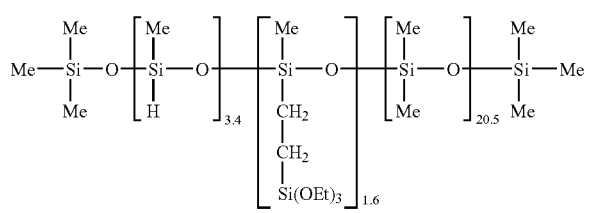

Example 5

Production of the emulsions for the use test. 19 g of an emulsifier mixture comprising an ethoxylated triglyceride having an HLB of 18 and an ethoxylated fatty alcohol having an HLB of 11 in a weight ratio of 6:4 are dissolved in 479 g of water.

Examples 1 to 4 are stirred separately into the solution, designated as 5a to 5d, and processed by means of an emulsifying machine (slit homogenizer) to give a stable emulsion.

These concentrates can be used directly or be adjusted to the desired use concentrations by simple dilution with water. These concentrations are dependent on the type of building materials to be hydrophobicized, in particular their porosity or their absorbency.

In general, these are formulations which contain about 10% by weight of compounds of the general formula (I).

Use Testing

The use testing of building protection compositions comprises assessment of the beading effect, determination of the water absorption using a method based on DIN 52103 (ASTM C97-47) and determination of the penetration depth on five impregnated lime-sand bricks.

The formulations were tested according to the following test procedure:

Material and Reagents

Lime-sand bricks, standard format, Terca® preclinker

The bricks are cut to the following format:

20 mm×70 mm×55 mm

Building protection emulsion (50% strength): 100 g

Tap water: 400 g

Laboratory balance (0.1 g display)

Immersion container with a plastic mesh (130 mm×90 mm×90 mm; W×H×D)

Water bath with plastic mesh

Crucible tongs

Stopwatch

Procedure

Cleaning and Conditioning of the Lime-Sand Bricks

The cut lime-sand bricks are irrigated at room temperature for 24 hours and cleaned with water and a brush until all dust is removed. The cleaned test specimens are subsequently dried in a drying oven at 105° C. for 24 hours and then stored at room temperature (about 23° C.) until their weight is constant.

Impregnation of the Bricks

The cleaned and conditioned lime-sand bricks are immersed for one minute in the ready-to-use solution (containing 10% by weight of the compounds of the general formula (I)). The supernatant liquid column here should be from about 10 to 15 mm. The impregnated bricks are taken from the bath using the crucible tongs and allowed to dry in air at room temperature on a mesh for 7 days.

Determination of the Beading Effect

To determine the beading effect, 0.5 ml of distilled water is placed on the surface of the brick by means of a pipette after one day and 7 days after impregnation. The outlet of the pipette should gently touch the surface so that the drop does not run off sideways. After 10 minutes, the water drop is shaken off and the beading effect is subsequently assessed. The quality of the beading effect is established according to the assessment criteria below (see point 8). The beading effect is determined on all test specimens and the mean is calculated.

Determination of the Water Absorption

After storage on a mesh at room temperature for from 7 to 14 days (depending on the substrate), the test specimens are weighed (M1) and placed in a water bath. The bath provided for this has a plastic mesh. The water column above the brick has to be 50 mm. After 24 hours, the bricks are taken from the water bath, the surface water is removed with cleaning paper and the test specimen is weighed (M2).

The result is reported in % by weight. A blank is always also determined.

Determination of the Penetration Depth

After determination of the water absorption, the test specimens are dried overnight at 105° C. and subsequently split by means of a hammer. The fracture surfaces are wetted with water. The unimpregnated places appear dark, while the impregnated hydrophobic zones are not wetted and remain light in color. If a penetration depth which differs greatly is observed on a test specimen, the arithmetic mean is to be formed.

Evaluation

Assessment Criteria for the Beading Effect

0=The water drop cannot be placed on the surface of the brick.
1=The water drop is not absorbed; no wetting of the surface by the drop.
2=The water drop is not absorbed; about half of the surface of the brick under the water drop is wetted.
3=The water drop is not absorbed; the surface of the brick under the water drop is fully wetted.
4=Less than 10% of the water drop is absorbed; dark coloration of the surface of the brick under the water drop.
5=50% of the water drop is absorbed.
6=The water drop is completely absorbed.

The beading effect after 7 days should correspond to the grade 3.

Calculation formula for the water absorption ($W_A$)

$$\frac{(M_2 - M_1) * 100}{M_1} = W_A$$

The result is reported in % by weight. The reduction in the water absorption after 24 hours should be at least 70% based on the blank.

Penetration Depth

The penetration depth is measured by breaking the brick and subsequently wetting it. The unwetted border is measured in mm.

Testing on Concrete B 35

| Product | Beading effect [0 = good to 6 = poor] | Penetration depth [mm] | Water absorption after storage under pressurized water [%] |
|---|---|---|---|
| Example 5c | 3 | 1.8 | 1.0 (reduction by 80%) |
| Example 5d | 3 | 2 | 0.9 (reduction by 82%) |
| Blank | 6 | — | 5.0 |

Testing on Lime-Sand Brick

| Product | Beading effect [0 = good to 6 = poor] | Penetration depth [mm] | Water absorption after storage under pressurized water [%] |
|---|---|---|---|
| Example 5c | 2 | 2.5 | 1.0 (reduction by 93%) |
| Example 5d | 2 | 2.3 | 1.0 (reduction by 93%) |
| Blank | 6 | — | 14.5 |

Testing on Terca® Clinker

| Product | Beading effect [0 = good to 6 = poor] | Penetration depth [mm] | Water absorption after storage under pressurized water [%] |
|---|---|---|---|
| Example 5a | 1 | >10 | 0.9 (reduction by 93%) |
| Example 5d | 2 | >10 | 0.7 (reduction by 95%) |
| Blank | 6 | — | 13.5 |

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. An organomodified siloxane compound of the general formula (I)

$$R^4-\underset{\underset{R^1}{|}}{\overset{\overset{R^1}{|}}{Si}}-O-\left[\underset{\underset{H}{|}}{\overset{\overset{R^1}{|}}{Si}}-O\right]_n\left[\underset{\underset{R^2}{|}}{\overset{\overset{R^1}{|}}{Si}}-O\right] \left[\underset{\underset{R^5-Si-R^5}{\underset{|}{R^5}}}{}\right]_m \left[\underset{\underset{R^3}{|}}{\overset{\overset{R^1}{|}}{Si}}-O\right]_o \left[\underset{\underset{R^1}{|}}{\overset{\overset{R^1}{|}}{Si}}-O\right]_p-\underset{\underset{R^1}{|}}{\overset{\overset{R^1}{|}}{Si}}-R^4$$

where the radicals $R^1$ are identical or different radicals selected from the group consisting of linear or branched, saturated or monounsaturated or polyunsaturated alkyl, aryl, alkylaryl or arylalkyl radicals having from 1 to 20 carbon atoms, the radicals $R^2$ are identical or different alkylene radicals which have from 1 to 20 carbon atoms, $R^3$ is an oxyalkylene radical of the formula (II), $$-[CH_2]_k-O-[[CH_2]_a-CH\cdot O]_{n^a}-[[CH_2]_b-\underset{\underset{R^{6b}}{|}}{CH\cdot O}]_{n^b}-R^{3a}$$
$$\phantom{-[CH_2]_k-O-[[CH_2]_a-CH\cdot O]_{n^a}}\underset{R^{6a}}{|}$$

where $R^{3a}$, $R^{6a}$, $R^{6b}$ are each, independently of one another, hydrogen, preferably methyl and/or ethyl or can each be a branched or unbranched, unsubstituted or heteroatom-substituent-bearing, saturated or unsaturated alkyl or aryl radical and k is from 2 to 11, a, b are each, independently of one another, a number in the range from 1 to 4 and $n^a$, $n^b$ are each, independently of one another, a number in the range from 0 to 50, where $1<n^a+n^b\leqq 50$, with the proviso that a random or blockwise arrangement of the oxyalkylene units can be present, the radicals $R^4$ are each, independently of one another, $R^1$, $-R^2-Si(R^5)_3$, $R^3$ or H, the radicals $R^5$ are identical or different alkyl, alkoxy, aryl, aryloxy or alkenyl radicals having from 1 to 20 carbon atoms, preferably a methoxy and/or ethoxy group, with the proviso that at least one $R^5$ is an alkoxy group, n is from 1 to 20, m is from 0 to 20, with m only being 0 when $R^4$ is the radical $-R^2-Si(R^5)_3$ and otherwise being $\geqq 1$, o is from 0 to 20, p is from 1 to 200.

2. The compound as claimed in claim 1, wherein $\geqq 90\%$ of the radicals $R^1$ are methyl groups and $R^2$ is an alkylene radical having from 1 to 5 carbon atoms.

3. The compound as claimed in claim 1, wherein $R^3$ is a radical of the general formula (II) in which $R^{3a}$ is a methyl and/or ethyl radical and $R^{6a}$, $R^{6b}$ are identical or different and are each hydrogen, methyl or ethyl.

4. The compound as claimed in claim 1, wherein $R^3$ is a radical of the general formula (II) in which $R^{3a}$ is a methyl and/or ethyl radical and $R^{6a}$, $R^{6b}$ are identical or different and are each hydrogen, methyl or ethyl, with the proviso that at least one of the radicals is hydrogen.

5. The compound as claimed in claim 1, wherein $R^3$ is a radical of the general formula (II) in which the alkoxy radicals $$-[[CH_2]_a-\underset{\underset{R^{6a}}{|}}{CHO}]_{n^a}- \text{ and } -[[CH_2]_a-\underset{\underset{R^{6b}}{|}}{CHO}]_{n^b}-$$

have a block character.

6. The compound as claimed in claim 1, wherein $R^4$ is the radical $-R^2-Si(R^5)_3$ in which $R^2$ is an alkylene radical having from 1 to 5 carbon atoms and at least one radical $R^5$ is a methoxy or ethoxy group.

7. The compound as claimed in claim 1, wherein $1<n^a+n^b\leqq 15$.

8. The compound as claimed in claim 1, wherein n, m, o <5 and p=10 to 50, with the proviso that at least one SiH bond and at least one alkoxy group are present in the molecule.

9. An aqueous preparation for the water-repellent impregnation of porous mineral building materials, which comprises a) from 10 to 80% by weight of compounds as claimed in claim 1, b) from 0.5 to 10% by weight of an emulsifier or emulsifier mixture, c) from 10 to 89.5% by weight of water and, if desired, d) from 0 to 0.5% by weight of preservative.

10. The aqueous preparation of claim 9, wherein $\geqq 90\%$ of the radicals $R^1$ are methyl groups and $R^2$ is an alkylene radical having from 1 to 5 carbon atoms.

11. The aqueous preparation of claim 9, wherein $R^3$ is a radical of the general formula (II) in which $R^{3a}$ is a methyl and/or ethyl radical and $R^{6a}$, $R^{6b}$ are identical or different and are each hydrogen, methyl or ethyl.

12. The aqueous preparation of claim 9, wherein $R^3$ is a radical of the general formula (II) in which $R^{3a}$ is a methyl and/or ethyl radical and $R^{6a}$, $R^{6b}$ are identical or different and are each hydrogen, methyl or ethyl, with the proviso that at least one of the radicals is hydrogen.

13. The aqueous preparation of claim 9, wherein $R^3$ is a radical of the general formula (II) in which the alkoxy radicals $$-[[CH_2]_a-\underset{\underset{R^{6a}}{|}}{CHO}]_{n^a}- \text{ and } -[[CH_2]_a-\underset{\underset{R^{6b}}{|}}{CHO}]_{n^b}-$$

have a block character.

14. The aqueous preparation of claim 9, wherein $R^4$ is the radical $-R^2-Si(R^5)_3$ in which $R^2$ is an alkylene radical having from 1 to 5 carbon atoms and at least one radical $R^5$ is a methoxy or ethoxy group.

15. The aqueous preparation of claim 9, wherein $1 < n^a + n^b \leqq 15$.

16. The aqueous preparation of claim 9, wherein n, m, o <5 and p=10 to 50, with the proviso that at least one SiH bond and at least one alkoxy group are present in the molecule.

17. A method of providing a water-repellent surface for a porous mineral building material by impregnating a porous mineral building material with the aqueous preparation of claim 9.

* * * * *